United States Patent
Hopper

(10) Patent No.: US 10,125,570 B2
(45) Date of Patent: Nov. 13, 2018

(54) VALVE ASSEMBLY

(71) Applicant: Cameron International Corporation, Houston, TX (US)

(72) Inventor: Hans Paul Hopper, Aberdeen (GB)

(73) Assignee: Cameron International Corporation, Houston, TX (US)

( * ) Notice: Subject to any disclaimer, the term of this patent is extended or adjusted under 35 U.S.C. 154(b) by 133 days.

(21) Appl. No.: 14/972,040

(22) Filed: Dec. 16, 2015

(65) Prior Publication Data

US 2016/0186877 A1 Jun. 30, 2016

(30) Foreign Application Priority Data

Dec. 24, 2014 (GB) .................................. 1423195.5

(51) Int. Cl.
| | |
|---|---|
| E21B 34/04 | (2006.01) |
| E21B 34/02 | (2006.01) |
| E21B 43/36 | (2006.01) |
| F16K 17/168 | (2006.01) |
| E21B 43/34 | (2006.01) |
| B01D 17/04 | (2006.01) |

(52) U.S. Cl.
CPC ............ *E21B 34/02* (2013.01); *B01D 17/047* (2013.01); *E21B 34/04* (2013.01); *E21B 43/34* (2013.01); *E21B 43/36* (2013.01); *F16K 17/168* (2013.01)

(58) Field of Classification Search
CPC ....... B01D 17/047; E21B 43/36; E21B 34/04; E21B 43/34; F16K 17/168
See application file for complete search history.

(56) References Cited

U.S. PATENT DOCUMENTS

| | | | | |
|---|---|---|---|---|
| 3,880,399 A | * | 4/1975 | Luthe ...................... | F16K 47/02 137/625.37 |
| 4,041,982 A | * | 8/1977 | Lindner .................. | F16K 47/08 137/625.3 |
| 4,569,370 A | * | 2/1986 | Witt .......................... | F16K 3/26 137/625.3 |
| 4,678,008 A | | 7/1987 | Gyongyossy | |
| 4,848,472 A | * | 7/1989 | Hopper ............... | E21B 33/0355 166/339 |
| 5,018,703 A | * | 5/1991 | Goode .................... | F16K 47/08 137/625.3 |
| 5,133,383 A | | 7/1992 | King | |
| 5,431,188 A | | 7/1995 | Cove | |
| 5,615,708 A | * | 4/1997 | Barron .................... | F16K 47/04 137/625.3 |

(Continued)

FOREIGN PATENT DOCUMENTS

EP 2042685 A1 4/2009

OTHER PUBLICATIONS

GB Examination Report for GB Application No. 1423195.5 dated Dec. 6, 2016; 5 Pages.

(Continued)

*Primary Examiner* — Matthew W Jellett
*Assistant Examiner* — Christopher Ballman
(74) *Attorney, Agent, or Firm* — Fletcher Yoder, P.C.

(57) ABSTRACT

A gate valve assembly, the assembly includes a gate valve having a gate assembly moveable between a closed position and an open position. The gate assembly includes a pressure equalizing assembly coupled to the gate valve that equalizes the fluid pressure across the gate valve.

25 Claims, 8 Drawing Sheets

(56) References Cited

U.S. PATENT DOCUMENTS

| | | | | |
|---|---|---|---|---|
| 5,957,207 A * | 9/1999 | Schnatzmeyer | ........ | E21B 34/06 |
| | | | | 166/320 |
| 8,371,333 B2 * | 2/2013 | Bohaychuk | ............... | F16K 3/26 |
| | | | | 137/625.33 |
| 8,490,652 B2 * | 7/2013 | Bohaychuk | ............... | F16K 3/24 |
| | | | | 137/375 |
| 9,458,941 B2 * | 10/2016 | Bohaychuk | ............. | F16K 3/246 |
| 2012/0227813 A1 * | 9/2012 | Meek | ................. | B01D 17/0217 |
| | | | | 137/1 |
| 2013/0263954 A1 | 10/2013 | McBride | | |
| 2014/0150881 A1 | 6/2014 | Hopper | | |
| 2016/0076353 A1 * | 3/2016 | Berle | ...................... | F04D 13/10 |
| | | | | 210/650 |

OTHER PUBLICATIONS

PCT International Search Report and Written Opinion; Application No. PCT/US2015/066494; dated May 10, 2016; 11 pages.

* cited by examiner

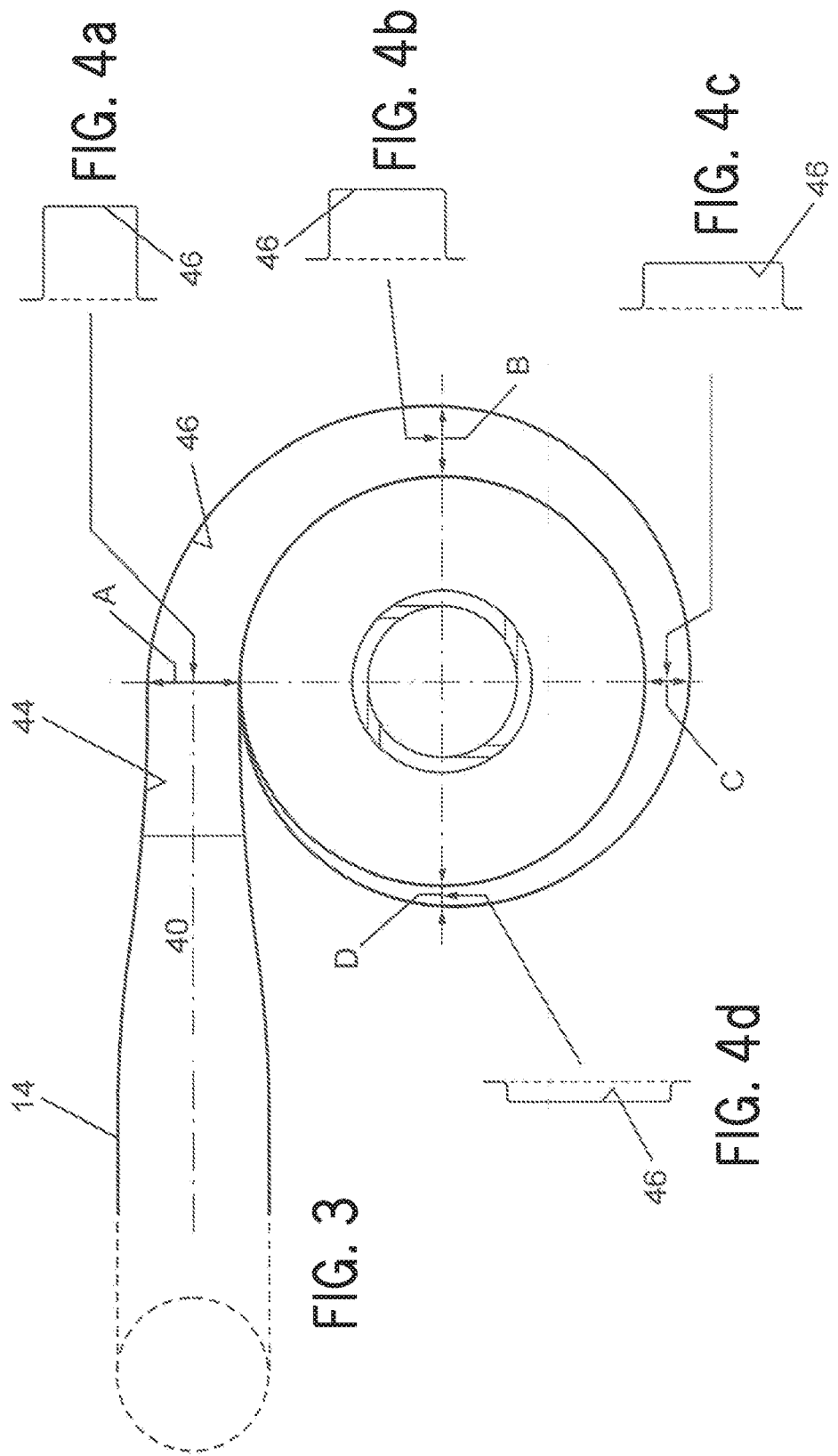

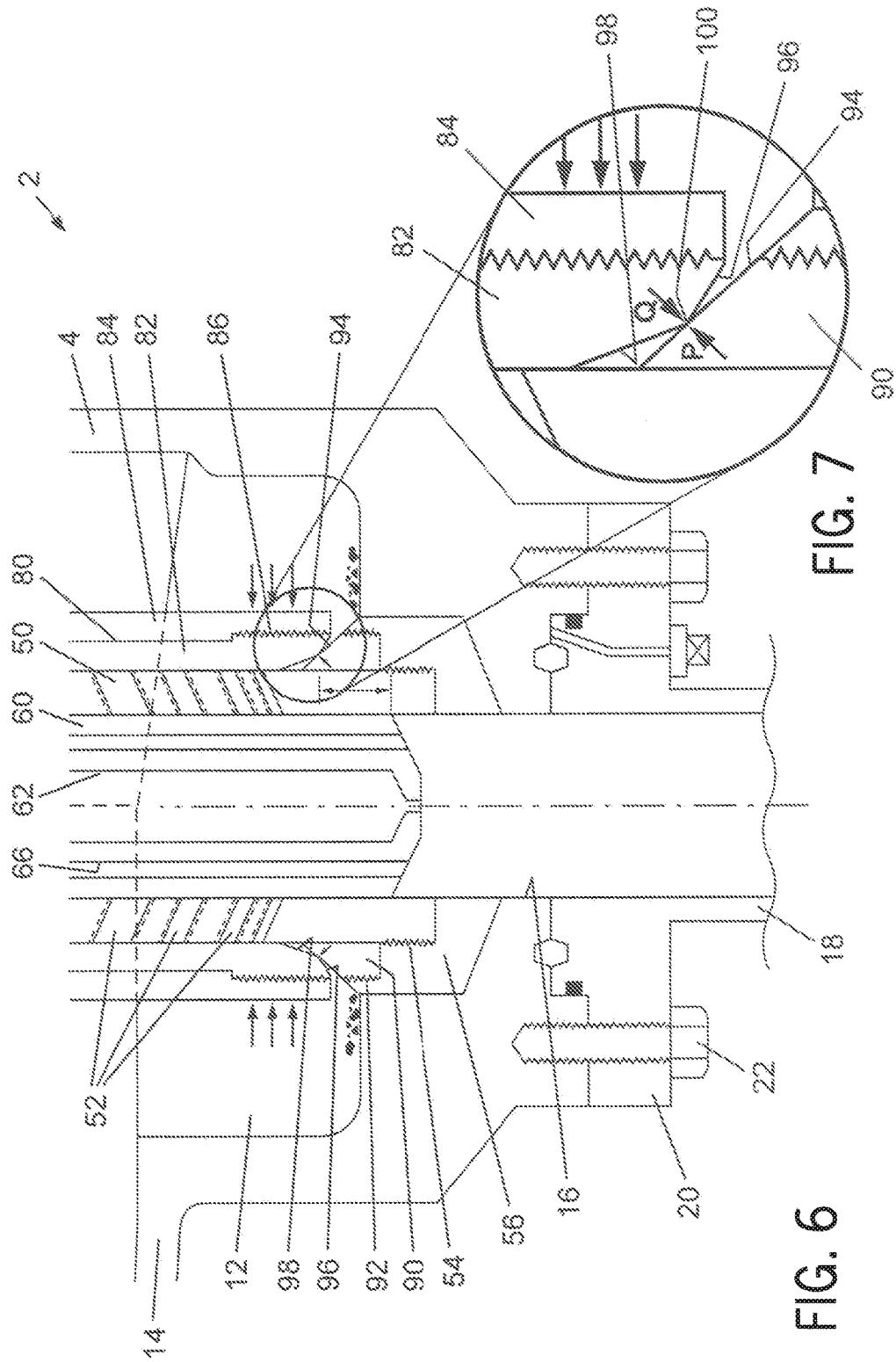

VALVE ASSEMBLY

CROSS REFERENCE TO RELATED APPLICATION

This application claims priority to and benefit of Great Britain Application No. GB1423195.5, entitled "VALVE ASSEMBLY", filed Dec. 24, 2014, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The present invention relates to a valve assembly, in particular to a valve assembly in which fluid pressure across the valve is required to be equalized before the position of the valve is changed, such as a gate valve or a ball valve. The valve assembly of the present invention finds particular use in wellhead assemblies and the control of fluids produced from subterranean wells, in particular in subsea locations.

Valves of differing designs and operating principles are also known. For example gate valves and ball valves are known. These forms of valve are known for use in controlling fluid flow and are generally operated between a fully open position and a fully closed position, as fluid flow is required. They offer some ability to control the flow of fluid between the fully open flowrate and zero flow achieved with the valve in the fully closed position. However, they are generally only used at relatively low pressures. Gate valves and ball valves are generally only used where no significant pressure differential exists between the fluid upstream and downstream of the valve. An alternative form of valve is the butterfly valve, generally also operated in a fully open or fully closed position, to control fluid flow. As butterfly valves are generally efficient only at low pressures, they are seldom used in wellhead installations, where a valve must be able to cope with being exposed to fluid at full wellhead pressure.

Check valves are used to allow fluid flow in a given direction, typically once a predetermined threshold pressure has been achieved and the valve is 'cracked', but to prevent the flow of fluids in the reverse direction. Various designs of check valve are known and operated, including ball check valves, diaphragm check valves and swing check valves.

Valves, such as gate valves and ball valves, are generally used in situations where the fluid pressure upstream of the valve is generally the same as the fluid pressure downstream of the valve, as noted above. In use, when changing the position of the valve, for example when closing an open valve or opening a closed valve, it is necessary to equalize the pressure of fluid on the upstream and downstream sides of the valve. Conventional valve designs do not in general provide for the pressure to be equalized in this manner without movement of the valve itself.

There is a need for an improved valve assembly, in particular for use in the control of fluids produced from a subterranean well, for example in a wellhead assembly.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 3 is a diagrammatical cross-sectional view of the lower housing of the pressure equalizing valve assembly along the line III-III of FIG. 2;

FIGS. 4a, 4b, 4c and 4d are diagrammatical cross-sectional views of the channel in the inner wall of the lower housing of the pressure equalizing valve assembly of FIG. 2, at the positions A, B, C and D respectively of FIG. 3;

FIG. 6 is a cross-sectional view of a portion of the flow control assembly of FIG. 1 in the fully closed position;

FIG. 7 is an enlarged cross-sectional view of the seating arrangement of the flow control assembly shown in FIG. 6;

DETAILED DESCRIPTION OF SPECIFIC EMBODIMENTS

Figure 1:
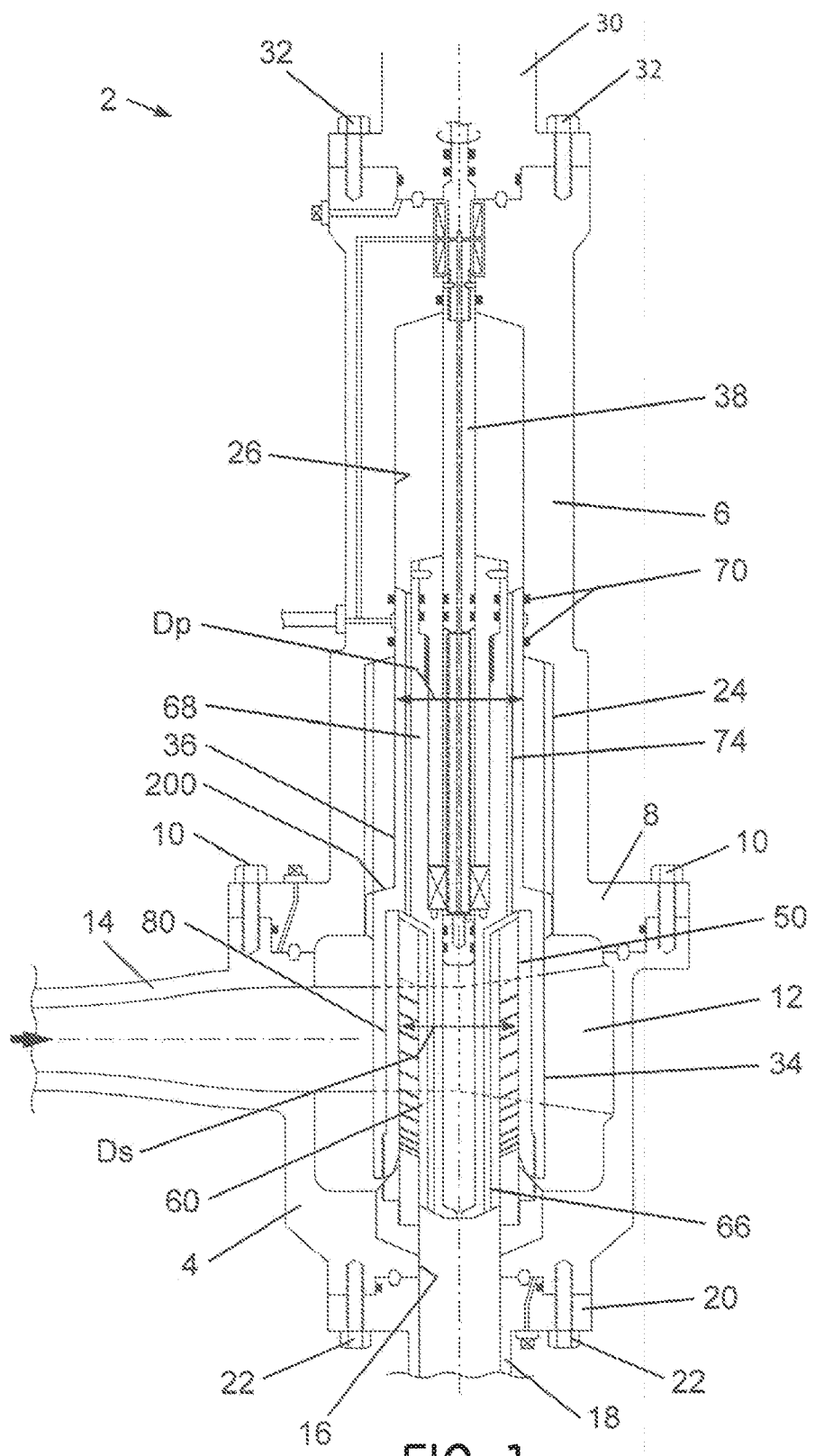
FIG. 1 is a cross-sectional view of an embodiment of a pressure equalizing valve assembly for use in the valve assembly of the present invention.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Fluids are produced from subterranean wells at high pressures. Fluids, such as gas and oil, together with fluids introduced into the well during drilling and completion operations, such as water and muds, can be produced from the well at pressures up to 10,000 psi and higher. Accordingly, the control of fluids produced from a well represents a significant task for a valve assembly, which must be able to operate in a very harsh environment.

It would be most advantageous if a valve assembly could be provided which may be used to control both the pressure of a fluid stream or the flowrate of the fluid stream, depending upon the operational requirements of the valve. In addition, it would be most useful if the valve assembly could offer a reliable shut-off capability, that is reduce fluid flow through the valve to zero without fluid leakage past the valve or a risk of failure of the valve. For a wellhead application, the valve assembly must be able to equalize the fluid pressure difference across the valve at high fluid pressures, for example a pressure drop across the valve of 3,000 psi or higher.

The present invention provides an improved design of valve, in particular a gate valve, for the control of fluid flow. The valve assembly of the present invention finds particular use in the control of fluids produced from subterranean wells, especially use in a wellhead assembly. The reliability of the valve assembly is such that it may be used in wellhead assemblies in remote and/or hard to reach locations, such as wellhead installations on the seabed.

In a first aspect, the present invention provides a gate valve assembly comprising:

a gate valve having a gate assembly moveable between a closed position and an open position, in use the gate valve having an upstream side and a downstream side;

the gate assembly comprising a pressure equalizing assembly for equalizing the fluid pressure across the gate valve, the pressure equalizing assembly comprising a pressure equalizing valve assembly;

wherein the pressure equalizing valve assembly comprises:
  a valve housing;
  a first port for fluid to enter or leave the valve housing;
  a second port for fluid to leave or enter the valve housing;
  a flow control assembly disposed within the valve housing between the first and second ports, whereby fluid entering the valve housing is caused to flow through the flow control assembly, the flow control assembly comprising:
    a cage having apertures therethrough to provide passage for fluid passing from the inlet to the outlet; and
    a closure assembly having a closure member moveable with respect to the cage between a first closed position, in which the closure member closes the apertures in the cage, and a second open position, in which the apertures in the cage are open.

The valve assembly comprises a gate valve. The gate valve is a valve which, in use, requires that pressure across the valve is equalized before the position of the valve is changed, in particular when the valve is moved from one of the open and the closed position to the other. Such gate valves are known in the art and are commercially available.

In use, the gate valve has an upstream side and a downstream side. The assembly of the present invention employs such gate valves and provides an improved means for equalizing the pressure between the upstream side of the gate valve and the downstream side of the gate valve.

The valve assembly of the present invention comprises a pressure equalizing assembly for equalizing the pressure difference between the upstream and downstream sides of the gate valve. The gate valve comprises a gate assembly having a gate, movement of which within the body of the valve provides control of the fluid flowing through the gate valve, as is known in the art. In the assembly of the present invention, the gate assembly comprises a pressure equalizing assembly.

The pressure equalizing valve assembly is used to equalize fluid pressure on either side of the gate valve, in particular on either side of the gate assembly of the valve. In use, the pressure equalizing valve assembly is operated to allow the flow of fluid through the gate assembly of the gate valve under the action of the pressure differential across the gate, to equalize the pressure on either side of the gate, thereby allowing the gate to be moved. The principle of the present invention relies upon the pressure equalizing valve assembly being one that can be operated, in particular opened, closed and used to control the flow of fluid through the pressure equalizing valve, under conditions of a high differential fluid pressure across the pressure equalizing valve assembly, in contrast to the gate valve. The present invention may employ any form of valve assembly as the pressure equalizing valve, provided it is able to operate under a high fluid pressure differential between the upstream side and downstream side of the main valve.

The preferred aspect of the present invention employs a particular form of flow valve assembly as the pressure equalizing valve assembly, that is a valve assembly comprising a cage having apertures through which fluid is allowed to flow and a closure member to selectively open and close the apertures, thereby controlling the flow of fluid therethrough.

The preferred pressure equalizing valve assembly comprises a housing. The housing may be provided by the gate assembly of the gate valve, with the interior of the housing being formed by a cavity in the gate assembly. Alternatively, the housing may be provided as a separate component to the gate assembly and mounted thereto. It is preferred that the housing of the pressure equalization valve assembly is formed as part of the gate assembly.

The housing has a first port for fluid and a second port for fluid, with a flow control assembly disposed within the housing between the fluid ports. As will be described hereinafter, the assembly may be oriented such that fluid enters one of the fluid ports and leaves through the other fluid port, depending upon the embodiment of the present invention. In one preferred arrangement, the pressure equalizing valve assembly is arranged whereby all the fluid entering the housing through one of the ports is caused to flow through the flow control assembly to leave the housing through the other port.

In one embodiment, the first port is in fluid flow connection with the outside of the cage, such that fluid entering the housing through the first port is provided to the exterior of the cage and flows through the apertures of the wall of the cage to the interior thereof. The second port is in fluid flow connection with the interior of the cage, such that fluid entering the housing through the second port is provided to the interior of the cage and flows through the apertures in the wall of the cage to the outside of the cage.

For the control of fluid flow through the pressure equalizing valve assembly and the equalization of fluid pressure across the gate assembly of the gate valve, it is preferred that the fluid at the higher pressure is provided to the first port.

In a preferred arrangement, the housing comprises a cavity therein connected to the first port, the flow control assembly being disposed within the cavity, preferably centrally, such that the cavity extends around the flow control assembly. In this way, fluid entering through the first port in the housing is caused to flow around the flow control assembly and enter the cage evenly from the cavity. In a preferred arrangement, to assist the even distribution of fluid within the cavity, the first port is arranged in the housing to extend tangentially to the walls of the cavity. It has been found that such an arrangement having a tangential entry provides an improved fluid control when using the closure member/cage arrangement of the valve assembly of the present invention. In particular, by directing incoming fluid into the cavity at an angle, the direct impact of the fluid onto the portion of the flow control assembly facing the inlet is avoided. This prevents premature wear and failure of the flow control assembly, in particular in the case of an erosive fluid stream, such as one containing entrained solid particles, such as may be produced from a subterranean well from time to time. In addition, by having the fluid stream directed in the cavity around the flow control assembly, a more even flow of fluid through the flow control assembly is obtained, in turn improving the control of the fluid flowrate and/or pressure.

In a particularly preferred arrangement, the first port has the form of an opening in the wall of the cavity, disposed to direct fluid into a channel or groove having the form of an involute and extending around the outer wall of the cavity. The channel or groove is formed to have a progressively smaller cross-sectional area, in order to progressively introduce fluid into the cavity around the flow control assembly. In this way, an even distribution of fluid around the flow control assembly is obtained.

As noted, the pressure equalizing valve assembly comprises a first port and a second port for fluid to enter and leave the valve housing. Between the ports is disposed a flow control assembly, operable to control the flow rate and/or pressure of fluid passing through the pressure equalizing valve assembly. The flow control assembly comprises a cage having apertures therethrough, through which fluid is caused to flow. The apertures are opened and closed as described hereafter. The control of the flow of fluid is obtained by selecting the number and/or size of apertures that are open for fluid passage. The cage may have any suitable form, but is preferably in the form of a generally cylindrical tube, with apertures extending through the wall of the tube.

The arrangement of the cage is such that the outside of the cage is in fluid connection with the first port and the interior of the cage is in fluid connection with the second port. In this way, in embodiments in which the first port is acting as the fluid inlet, fluid enters the housing through the first port, flows through the apertures into the cage interior and leaves the housing through the second port. In embodiments in which the second port is acting as the fluid inlet, fluid enters the housing through the second port, flows into the interior of the cage, passes through the apertures in the cage wall and leaves the housing through the first port.

The apertures may extend through the wall of the cage and be arranged around the cage in any suitable pattern. Known patterns for the apertures include overlapping rows of apertures of different sizes. In one preferred arrangement, the apertures are arranged in a plurality of rows, each row containing one or more apertures, with adjacent rows being separated by a land or region having no apertures therethrough. This arrangement improves the accuracy of the control of fluid flow, by allowing a closure member, such as a plug or sleeve, to lie with its end face extending across the land, thereby leaving the apertures either fully open or fully closed, depending upon their position relative to the closure member. In addition, the option of having the end face of the closure member in a position where it does not extend across a partially open aperture allows the end face of the closure member to be protected from the stream of fluid passing through the aperture. In known arrangement, it is frequently the case that the end faces of closure members, such as plugs or sleeves, are eroded by the streams or jets of fluid formed as the fluid passes through the apertures in the cage. These streams or jets can quickly erode the plug or sleeve, in particular eroding the surface of the plug or sleeve that contacts the seat in the fully closed position. This in turn reduces the ability of the plug or sleeve to form a complete seal to prevent fluid flow when fully closed.

As noted, the apertures in the cage are preferably arranged in rows. The arrangement and relationship of apertures in adjacent rows may be any suitable or preferred pattern. However, in one preferred arrangement, the centers of the apertures in adjacent rows of the cage are offset from each other circumferentially around the exterior surface of the cage. In a particularly preferred arrangement, the apertures are arranged such that adjacent apertures in adjacent rows extend in a helical pattern along and around the cage. This is a particularly preferred arrangement when the apertures are angled in the aforementioned preferred manner. This arrangement is of particular advantage when the assembly is being used to process fluid streams produced from subterranean wells, in particular fluid streams comprising a plurality of liquid phases, especially oil and water, and a gas phase.

The apertures may extend through the cage in any suitable direction. In known arrangements, the apertures extend radially inwards through the cage wall. In one preferred arrangement, the apertures extend inwards, in a plane perpendicular to the longitudinal axis of the cage, but at an angle to the radial direction, in order to direct the fluid entering the cage in a circular flow pattern within the cage cavity. In a particularly preferred arrangement, the apertures extend through the cage wall and open tangentially to the inner surface of the wall. In a further preferred arrangement, the apertures extend through the cage wall at an angle to the plane perpendicular to the longitudinal axis of the cage and at an angle to the radial direction. In particular, the apertures extend at an angle to the plane perpendicular to the longitudinal axis in either the upstream direction or downstream direction of fluid within the cage. In this way, the fluid is caused to flow in a helical flow pattern within the cage. In particular, the apertures may be angled to avoid the fluid stream from one aperture contacting the fluid stream from an adjacent aperture.

The flow control assembly comprises means to open and close the apertures extending through the cage, in order to control the flow of fluid through the valve assembly. In particular, the flow control assembly comprises a closure assembly having a closure member. The closure member is moveable with respect to the cage, so as to open and close the apertures in the cage wall, thereby varying the cross-sectional area of the apertures available for the flow of fluid through the wall of the cage.

The closure member may be disposed within the cage and be moveable with respect to the cage and the apertures extending through the wall of the cage. In this arrangement, the closure member acts to open or close the apertures by closing and sealing the inner end of each aperture. The closure member is moveable between a first position, in which it obscures and closes all the apertures in the cage, and a second position, in which it overlies and obscures none of the apertures in the cage. The closure member may be positioned between the first and second positions, such that a portion of the apertures are open for the passage of fluid therethrough, and the remainder of the apertures are closed to the flow of fluid. The flow of fluid through the valve assembly may thus be controlled by the appropriate position of the closure member within the cage.

The closure member within the cage may have any suitable form. For example, in the case of a generally cylindrical tubular cage, the closure member may be a cylindrical sleeve or a cylindrical plug, the outer diameter of which corresponds to the inner diameter of the cage.

Alternatively, the closure member may be disposed outside the cage and be moveable with respect to the cage and the apertures extending through the wall of the cage. In this arrangement, the closure member acts to open or close the apertures by closing and sealing the outer end of each aperture. The closure member is moveable between a first position, in which it obscures and closes all the apertures in the cage, and a second position, in which it overlies and obscures none of the apertures in the cage. The closure member may be positioned between the first and second positions outside the cage, such that a portion of the apertures are open for the passage of fluid therethrough, and the remainder of the apertures are closed to the flow of fluid. The flow of fluid through the valve assembly may thus be controlled by the appropriate position of the closure member outside the cage.

The closure member outside the cage may have any suitable form. For example, in the case of a generally cylindrical tubular cage, the closure member may be a cylindrical sleeve, the inner diameter of which corresponds to the outer diameter of the cage.

In one preferred embodiment, the pressure equalizing valve assembly comprises a first closure member disposed within the cage, as described above, and a second closure member disposed outside the cage, as described above. The first and second closure members may be moved independently from one another, relative to the cage. In this case, the pressure equalizing valve assembly will further comprise an actuator assembly for each of the first and second closure members. In a preferred arrangement, the first and second closure members are moved together, preferably by being connected to one another, by a single actuator assembly. This arrangement offers certain advantages, as described hereinafter.

Both the first and second closure members may be used to control the flow of fluid through the pressure equalizing valve assembly. In one arrangement, the first and second closure members are sized relative to one another and the cage that, when moved together, at a given position of the closure assembly, the first and second closure members are closing the same apertures through the cage wall and leaving the same apertures open for fluid flow. In other words, a given aperture will either be open at both its inner and outer ends or will be closed at both its inner and outer ends.

In a preferred arrangement, the first and second closure members are sized and arranged differently with respect to one another and the cage, such that in a given position of the closure assembly, the first and second closure members are obscuring and closing a different number of apertures. In particular, one of the first or second closure members is arranged such that, as the closure members are moved from the first, closed position, the said one closure member begins to open the respective ends apertures in the cage wall, while the other ends of the same apertures remain closed. In this way, the said one closure member acts as a shut-off member, responsible for shutting off the flow of fluid through the valve assembly, while the other closure member is acting to control the flow of the fluid through the apertures in the cage. While the respective ends of apertures will be opened as the said one closure member moves from the first, closed position towards the second, open position, fluid will not flow through the apertures in the cage wall until the other of the two closure members has moved sufficiently to open the apertures to fluid flow. In this way, the other closure member acts as the flow control member, the position of which is responsible for determining the flow of fluid through the cage and the valve assembly. Preferably, the member acting as the shut-off member is the second closure member, disposed outside the cage, while the flow control member is the first closure member disposed within the cage.

In a particularly preferred arrangement, as noted hereinbefore, the cage is a generally cylindrical tube. The first closure member is a plug or sleeve extending and moveable longitudinally within the tubular cage, while the second closure member is a sleeve extending and moveable longitudinally outside the tubular cage. In the preferred arrangement, the second or outer closure member is the shut-off member and the first or inner closure member is the flow control member. The respective roles of the two closure members may be achieved by having the first closure member longer than the second closure member. In this way, as the two closure members are moved longitudinally together from the first, closed position towards the second, open position, the second closure member progressively reveals the outer ends of the apertures in the cage. Once the outer ends of the apertures are revealed, further longitudinal movement of the first closure member within the cage is required to open the inner ends of the same apertures and allow fluid flow to occur. The flow rate of fluid through the cage and the valve assembly as a whole is thus controlled by the longitudinal position of the first closure member within the cage, and not the longitudinal position of the second closure member outside the cage.

As noted hereinbefore, the first and second closure members may be moveable independently of one another. However, a preferred closure assembly is one in which the first and second closure members are moveable together, more preferably by being connected. In one preferred arrangement, the first and second closure members extend from a single support member, such that movement of the support member causes corresponding movement of both the first and second closure members.

Preferably, the support member is in the form of a piston moveable within a chamber. In a particularly preferred arrangement, the chamber is in fluid connection with fluid be processed through the valve, more preferably by means of a conduit extending through the closure assembly, thereby providing the chamber with fluid being processed at the prevailing pressure of the fluid. In one preferred embodiment, the closure assembly comprises a closure member moveable within the cage, the closure member having a conduit extending longitudinally therethrough to connect the chamber with the interior of the cage, thereby allowing fluid to be provided to the chamber from the interior of the cage and at the fluid pressure prevailing within the cage.

The pressure equalizing valve assembly further comprises means to move the closure assembly. Suitable actuators for moving the closure assembly are known in the art and may be employed. More preferably, the means for moving the closure assembly are linked to means for moving the gate of the gate assembly, such that movement of the gate results in movement of the closure assembly. In a preferred embodiment, the closure assembly of the pressure equalizing valve assembly is moved by the gate of the gate valve. In particular, movement of the gate from the fully closed position, in which both the gate and the pressure equalizing valve assembly are fully closed and fluid does not flow through the gate valve, first moves the closure assembly of the pressure equalizing valve assembly to open apertures in the cage of the flow control assembly. Thereafter, once the pressure equalizing valve assembly is fully open, continued movement of the gate opens the gate and allows fluid to flow through the gate valve in a generally conventional manner.

Similarly, closing the gate first moves the gate towards the closed position and then finally closes the pressure equalizing valve assembly.

In a preferred arrangement, the pressure equalizing valve assembly is moveable with the gate, more preferably being arranged within the gate assembly.

As noted hereinbefore, in one embodiment, one of the first and second closure members acts as a shut-off member, that is to close the pressure equalizing valve assembly and prevent the flow of fluid therethrough. As also noted, a preferred arrangement is to have the second closure member, disposed outside the cage, as the shut-off member. In order to effectively close the pressure equalizing valve assembly to the flow of fluid, the relevant member is provided with a seat which is engaged by a sealing surface of the member when in the first or closed position. Accordingly, in the preferred arrangement, the second member is provided with a seat extending around the cage, which is engaged by a sealing surface of the second member when in the first or closed position.

Seat arrangements for use with the shut-off closure member are known in the art. However, it has been found that the seat of the pressure equalizing valve assembly can suffer significant wear, in particular due to erosion by fluid flowing past and over the seat as it enters the apertures in the cage. The erosion of the seat is particularly acute when the fluid stream has solid particles entrained therein. Similar significant wear of the sealing surface of the closure member can also take place. Accordingly, it is preferred that the seat is disposed in a position that is displaced from the apertures in the cage, whereby the seat is out of the direct flow path of fluid passing through the apertures and entering the cage.

It is preferred to employ a seating assembly that is self-sharpening. That is, the action of the closure member moving into and out of engagement with the seat itself wears both the seat and the sealing surface of the closure member in a predetermined pattern that removes damage to the seat and the sealing surface of the closure member. The closure member is preferably formed of a hard material, relative to the seat, which is of a softer material. In this way, the action of the closure member contacting the seat wears the surface of the seat, to remove any pits and the like formed as a result of damage caused to the seat by action of the fluid and/or any entrained solids.

The surface of the seat preferably extends at an acute angle to the longitudinal axis of the closure member and the cage, whereby solid particles that fall onto or come to rest on the surface of the seat are caused to move off the seat, for example under the action of gravity. In this way, the seat may be kept relatively clean of debris, limiting damage to the sealing surfaces of the seat and the closure member and improving the fluid seal between the seat and the closure member.

A seat may be provided to be contacted by each of the closure members, with each closure member having a respective seat disposed to be contacted by a sealing surface of the closure member when the closure member is in the first, closed position. More preferably, a seat is provided for one of the first or second closure members only.

In one arrangement, the seat is formed within the cage, to be contacted by a sealing surface of the first closure member. For example, the seat may be formed as a shoulder within the cage member, with which the first closure member is brought into contact, when moving into the first, closed position. In such a case, the seat is preferably formed as an angled shoulder within the cage, such that solid debris on the cage is directed inwards towards the center of the cage member.

The seat is preferably formed outside the cage, so as to be contacted by the second member. As noted above, one preferred arrangement for the closure assembly of the valve assembly of the present invention comprises a generally cylindrical tubular cage, with a second closure member in the form of a cylindrical sleeve extending around the outer surface of the cage. The seat arrangement for the second enclosure member, disposed outside, that is on the upstream side of the cage member, is preferably formed and interacts with the second closure member in manner that allows the fluid pressure on the inlet side of the cage to bear against the second closure member and force the sealing portion of the second closure member into contact with the sealing surface of the seat. In this way, the fluid seal between the second closure member and the seat is assisted by the inlet fluid pressure, when the first port is acting as the fluid inlet.

Further or in addition to the aforementioned use of the inlet fluid pressure to urge the second closure member against the sealing surface of the seat, the seat and the second closure member may be arranged such that, when in contact, stresses are developed in the closure member to urge the seat and closure member into contact. In particular, the seat and the second closure member may be arranged to generate an outward hoop force on the sleeve as the closure member is forced into contact with the seat by the actuator. This in turn improves the sealing efficiency of the sleeve against the surface of the seat.

One preferred design of seat assembly for the second closure member comprises a seat having a sealing surface extending at an angle to the longitudinal axis of the cage. Most preferably, the sealing surface of the seat extends away from the cage at an acute angle to the longitudinal axis of the cage in the direction of movement of the second closure member when moving into the first, closed position. The second closure member is provided with a complimentary sealing surface, in particular on the end surface of the sleeve. The complimentary sealing surface may comprise a single surface extending at an appropriate angle so as to form a seal with the angle sealing surface of the seat, when the sleeve is in the first, closed position. In one arrangement, the sealing surface on the end surface of the sleeve extends at an acute angle to the longitudinal axis of the cage in the direction of movement of the second closure member when moving into the second open position. In this way, the sleeve is provided with a leading edge, which contacts the sealing surface of the seat.

Alternatively and more preferably, the sleeve may comprise a compound surface having at least two surface portions extending at an obtuse angle to one another. The ridge formed by the compound surfaces contacts the sealing surface of the seat and provides the seal, to prevent the flow of fluid through the cage. As the sleeve moves into and out of the first, closed position, the ridge is caused to move across the sealing surface of the seat, removing damage caused to the surface by the erosive effects of the fluid.

As described hereinbefore, the pressure equalizing valve assembly used in the valve assembly of present invention is particularly suitable for controlling the flow of fluid streams at high pressure through the gate valve, in particular when the fluid streams produced by a subterranean well or the fluid streams flowing into and out of a wellhead assembly. When operating with fluid streams at high pressures, a particular problem arises with the actuation of the pressure equalizing valve assembly and the movement of the components exposed to the fluid stream. The problem arises when the valve components, such as the closure member, are being acted upon by the fluid stream, the pressure of which bears upon one or more surfaces of the components and urges them to a particular position, for example the first, closed position or the second, open position. In such a case, the actuating mechanism must move the valve components against the action of the fluid pressure. This can place significant strain on the actuating mechanism, requiring the actuator to be increased in power to cope with the additional burden. This burden increases as the operating pressure of the pressure equalizing valve assembly increases.

Accordingly, in one embodiment, it is preferred to have the closure assembly of the pressure equalizing valve assembly arranged so as to be biased by the fluid pressure into the closed position. In particular, the closure assembly is biased into the closed position by the action of fluid pressure within the interior of the cage. This may be achieved, for example by the aforementioned arrangement of having the closure assembly comprise a chamber connected by a conduit to the interior of the cage, for example by having the conduit extend through a closure member moveable within the cage.

As noted above, the gate assembly comprises a moveable gate, for controlling the flow of fluid through the gate valve. The gate is moved by an actuator. Suitable actuators for moving the gate of the gate valve are known in the art and are commercially available. Suitable actuators include electric actuators and hydraulic actuators.

As noted above, the gate valve assembly of the present invention comprises a gate assembly disposed between the upstream side of the gate valve and the downstream side of the gate valve. The gate assembly comprises the pressure equalizing valve assembly. The gate assembly may be provided with a single pressure equalizing valve assembly. In such an embodiment, the pressure equalizing valve assembly may be arranged such that the second port is connected to the upstream side of the gate valve, that is the side of the gate valve with the highest fluid pressure, and the first port is connected to the downstream side of the gate valve, that is the side of the gate valve with the lower pressure. Alternatively, the pressure equalizing valve assembly is arranged to have the first port connected to the upstream or high pressure side of the gate valve, while the second port is connected to the downstream or lower pressure side of the gate valve.

More preferably, the gate assembly is provided with two pressure equalizing valve assemblies. In this way, the pressure equalizing valve assemblies may be arranged to accommodate a reversal of the fluid flow through the gate valve and still provide efficient pressure equalization across the gate valve, when in use.

In one preferred embodiment, the first pressure equalizing valve assembly is arranged to have its second port connected to the upstream or higher pressure side of the gate valve and the second pressure equalizing valve assembly is arranged to have its second port connected to the downstream or lower pressure side of the gate valve. The first ports of the first and second pressure equalizing valve assemblies are connected. In an alternative embodiment, the first port of the first pressure equalizing valve assembly is connected to upstream side of the gate valve and the first port of the second pressure equalizing valve assembly is connected to the downstream side of the gate valve. In this arrangement, the second ports of the first and second pressure equalizing valve assemblies are connected together.

In embodiments with two pressure equalizing valve assemblies in the gate assembly, it is preferred that the closure assemblies of both valves are moved together, preferably by being connected to and acted upon by a single, common actuator. Preferably, the common actuator is the gate of the gate assembly, whereby movement of the gate results in movement of both closure assemblies. It is preferred that the gate is connected to each closure assembly so as to provide an equal force to the closure members, in particular to apply an equal force acting to close and hold closed the closure members. In a preferred arrangement, the connection between the gate and each closure assembly comprises a resilient connecting member.

In a further aspect, the present invention provides a system for the production of oil and/or gas from a subterranean well, for example a wellhead assembly, comprising a valve assembly as hereinbefore described. The valve assembly is particularly suitable for subsea installations.

Referring to FIG. 1, there is shown one embodiment of a pressure equalizing valve assembly, generally indicated as 2. The pressure equalizing valve assembly of FIG. 1 is one that may be used in the valve assembly of the present invention, either directly or with minor modifications.

The pressure equalizing valve assembly 2 comprises a generally cylindrical lower housing 4 and a generally cylindrical upper housing 6. The upper housing 6 has a flange 8 formed around its lower end portion, allowing the upper housing 6 to be mounted to the lower housing 4 by means of bolts 10 in a conventional manner.

References herein to 'upper' and 'lower' are used for the purposes of ease of identification of components in the accompanying figures and are used in relation to the orientation of the apparatus shown in the figures only, it being understood that the assemblies of the present invention may be used in any appropriate orientation and need not be limited to operation in the orientation shown in the accompanying drawings.

The lower housing 4 comprises a generally cylindrical flow chamber 12 formed therein and has a first port 14 for fluid and a second port 16 for fluid. Fluid may enter or leave the housing 4 through either of the first and second ports 14, 16, depending upon the arrangement of the pressure equalizing valve assembly. The inlet 14 has a generally circular cross-section in the portion more distant from the lower housing 4, transitioning smoothly to a generally rectangular feed section in its portion closest to the lower housing 4 and immediately before the flow chamber 12. The first port 14 is arranged laterally to open in the side of the flow chamber 12, as shown in FIG. 1, while the second port 16 is arranged axially in the lower portion of the lower housing 4, as also shown in FIG. 1. Fluid may be led to or removed from the first port 14 by a conventional pipe (not shown for clarity). Similarly, fluid may be led to or away from the second port 16 through a conventional pipe 18, mounted to the lower portion of the lower housing by means of a flange 20 and bolts 22, again of conventional design.

Alternatively, the second port 16 may be provided with a conduit, for example a passage or bore formed in the gate assembly of the valve assembly, in particular when the pressure equalizing valve assembly 2 is incorporated within the gate assembly of the gate valve, as described hereinafter.

The upper housing 6 comprises a first, generally cylindrical chamber 24 therein in its lower region which opens into the flow chamber 12 in the lower housing 4. The upper housing 6 further comprises a second, generally cylindrical chamber 26 therein in its upper region. The second chamber 26 is sealed from the first chamber as described hereinafter. An actuator assembly 30, of known design and commercially available, may be mounted to the upper end of the upper housing 6 by bolts 32, in conventional manner. The actuator assembly 30 may comprise any suitable form of actuator, for example a hydraulic, electro-hydraulic or electric actuator. Electric actuators are preferred.

Alternatively, actuation of the pressure equalizing valve assembly may be provided by movement of the gate of the gate assembly, as described hereinafter.

The pressure equalizing valve assembly valve assembly 2 further comprises a flow control assembly, generally indicated as 34, disposed within the flow chamber 12 of the lower housing, the flow control assembly 34 having a closure assembly, generally indicated as 36. Components of the closure assembly 36 extend into the first chamber 24 in the upper housing 6 and into the second chamber 26 of the upper housing 6. The closure assembly 36 is sealed to the interior of the upper housing 6 at the junction between the first and second chambers 24, 26. Details of the flow control assembly and the closure assembly are described hereinafter.

In the embodiment shown, a shaft 38 extends from the actuator assembly 30 and connects with the upper end of the closure assembly 36.

Figure 2:
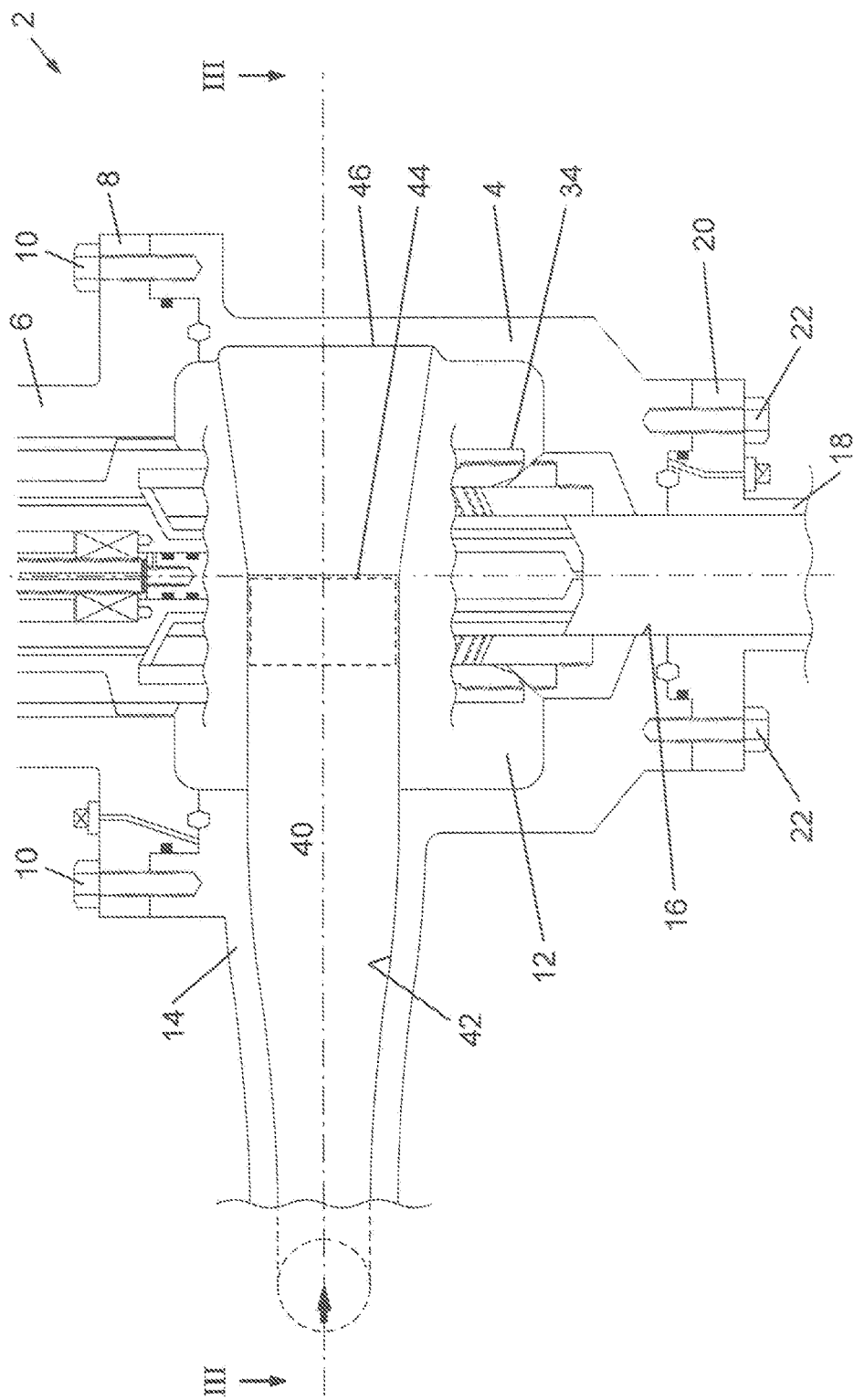
FIG. 2 is a cut-away, cross-sectional view of the lower housing of the pressure equalizing valve assembly of FIG. 1.

As noted above, the first port 14 opens into the flow chamber 12 of the lower housing 4 and is disposed in the side of the lower housing, so as to direct incoming fluid laterally into the flow chamber 12. Referring to FIG. 2, there is shown a cut-away cross-sectional view of the lower housing 4, with a portion of the flow control assembly 34 removed, to show details of the fluid inlet arrangement of the flow chamber 12. A diagrammatical cross-sectional view along the line III-III of FIG. 2 is shown in FIG. 3.

Referring to FIG. 2, the first port 14 is arranged to have a passage 40 extending tangentially into the flow chamber 12. The first port 14 is formed to provide the passage 40 with a generally circular portion 42, and a generally rectangular orifice 44, indicated by a dotted line, opening into the flow chamber 12. The passage 40 is arranged to open at the orifice 44 tangentially to the inner wall of the lower housing 12. In this way, fluid entering the flow chamber 12 through the passage 40 is caused to flow in a circular pattern within the flow chamber 12. This has the effect of distributing the fluid around the flow control assembly 34 within the flow chamber 12. This has a number of advantageous effects. First, the incoming fluid is not caused to directly impinge upon the outer surfaces of the flow control assembly 34, as is the case with known and conventional plug-and-cage choke designs. This in turn prevents damage to the flow control assembly 34 arising from the impact of entrained solid materials and particles. Second, introducing the fluid into the flow chamber 12 tangentially allows the fluid to flow in a lower shear regime that is possible with the conventional and known arrangements, in which the incoming fluid is directed orthogonally at the plug-and-cage assembly. This in turn reduces the effects to which the various phases in the fluid stream are mixed, perhaps undoing earlier separation that may have occurred in the process lines and equipment upstream of the valve assembly. Further, the circular or rotating flow pattern within the flow chamber 12 induces separation of the different phases within the fluid stream, according to the respective densities of the phases. Further, the arrangement shown in the figures ensures that the incoming fluid stream is evenly distributed within the flow chamber 12 around the flow control assembly. This in turn increases the effectiveness and efficiency of the flow control assembly in controlling the flowrate and/or pressure of the fluid stream.

The inner wall of the lower housing 4 defining the flow chamber 12 is formed with a channel 46 therein. The channel 46 is aligned with the orifice 44 and forms an involute path for fluid entering the flow chamber 12. The channel 46 is extends circumferentially around the flow chamber 12, as shown in FIG. 3. The channel 46 decreases in cross-sectional area, travelling in the circumferential direction away from the orifice 44, that is the path followed by an incoming fluid stream. In this way, when fluid enters the housing through the first port 14, the fluid stream is encouraged gradually to enter the central region of the flow chamber 12 and flow towards the centrally located flow control assembly 34.

Details of the cross section of the channel 46 are shown in FIGS. 4a, 4b, 4c and 4d at the positions A, B, C and D of FIG. 3, respectively. As can be seen, the cross-sectional area of the channel 46 decreases in the direction of fluid flow circumferentially away from the inlet orifice 44. This reduction in cross-sectional area of the channel 46 ensures that fluid leaves the channel as it travel circumferentially around the flow chamber 12, as noted above. This reduction in cross-sectional area is achieved in the embodiment shown in FIGS. 2 and 3 by having the depth of the channel 46 decrease in the direction extending circumferentially away from the orifice 44. However, in the embodiment shown, this reduction in depth is accompanied by an increase in the width of the channel in the longitudinal direction of the lower housing 12. This increase in width has the effect of distributing the fluid stream longitudinally within the flow chamber 12. This in turn ensures that the flow control assembly has an even exposure to the fluid stream to be controlled. The reduction in cross-sectional area of the channel 46 is preferably gradual or progressive, as shown in FIGS. 2 and 3. In the embodiment shown, the cross-sectional area reduces by 25% for each 90° of turn of the fluid stream. Thus, if the cross-sectional area of the orifice 44, as shown in FIG. 4a is A, the cross-sectional area of the channel at the positions shown in FIGS. 4b, 4c and 4d is 0.75 A, 0.5 A and 0.25 A, respectively.

Figure 5:
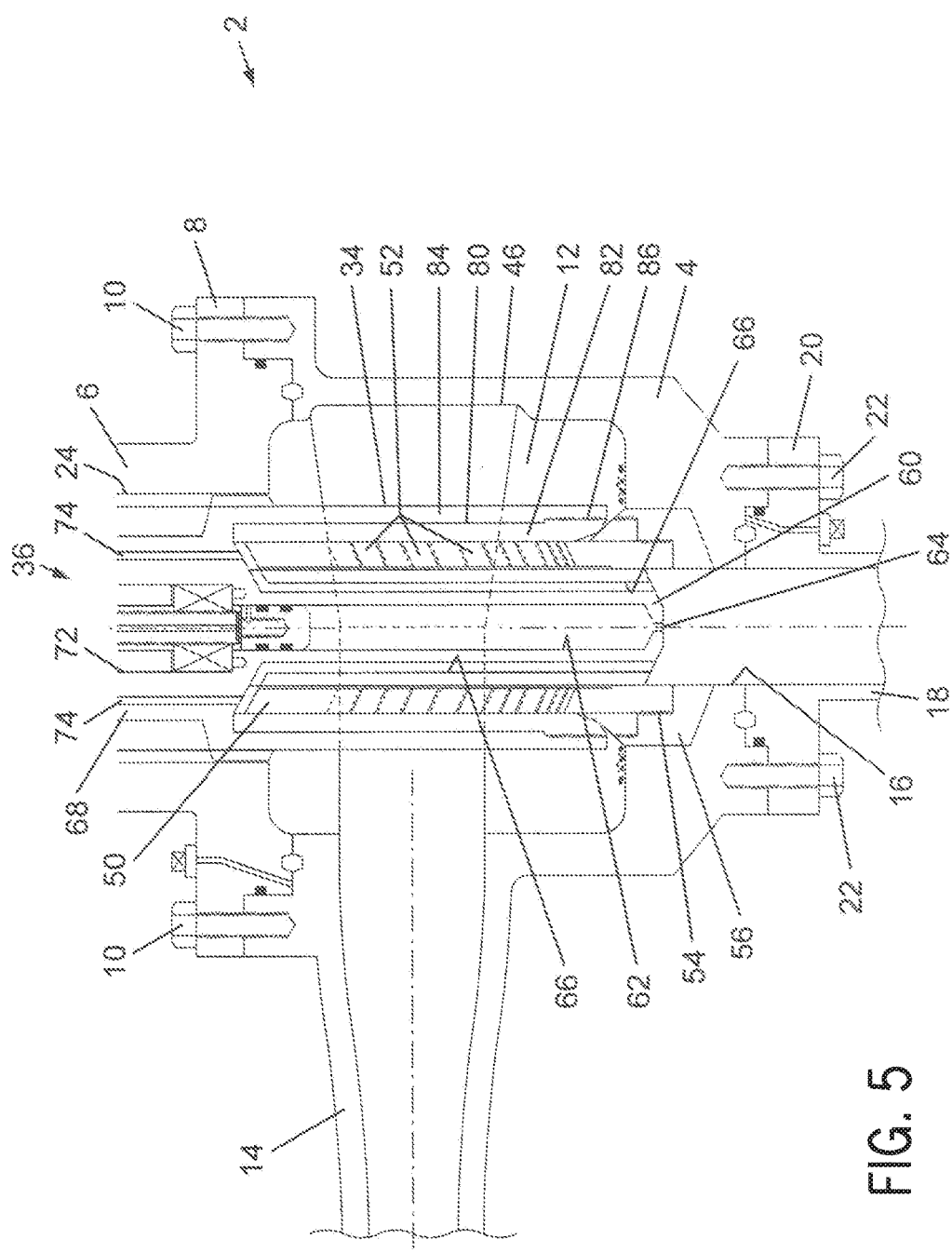
FIG. 5 is a cross-sectional view of the lower housing of the pressure equalizing valve assembly of FIG. 1, showing the flow control assembly therein.

Referring to FIG. 5, there is shown a vertical cross-sectional view of the lower housing 4 of the pressure equalizing valve assembly 2 of FIG. 1, showing the flow control assembly 34. The flow control assembly 34 comprises a cage 50 formed as a generally cylindrical tube extending longitudinally within the flow chamber 12. The cage 50 has a plurality of apertures 52 extending therethrough. In the embodiment shown, the apertures 52 extend through the wall of the cage 50 at an angle to the longitudinal axis, that is in a downwards direction, as viewed in the figures. In addition, the apertures 52 extend through the cage wall at an angle to the radial direction, so as to open tangentially to the inner surface of the cage.

The cage 50 has its lower end portion formed with a thread 54 on its outer surface. The cage 50 is mounted within the flow chamber 12 by being screwed into a threaded boss 56 inserted into the lower end wall of the lower housing 12 adjacent the second port 16. The interior of the cage 50 is in fluid flow communication with the second port 16 by means of a bore formed in the boss 56, such that fluid flowing through the apertures 52 in the cage 50 and entering the interior of the cage 50 may leave the valve assembly through the second port 16.

The flow control assembly 34 further comprises a closure assembly 36. The closure assembly 36 comprises a plug 60 extending within the central bore of the cage 50. The plug 60 is machined to be a close fit with the inner walls of the cage 50 and is slideable longitudinally within the cage 50, as will be described hereinafter. The plug 60 is generally cylindrical, having a longitudinal bore 62 formed therein. The bore 62 is open to the interior of the cage 50 by virtue of a small diameter bore 64 formed in the end of the plug 60. In this way, fluid within the bore 62 is able to leave the plug 60, thus preventing a hydraulic lock occurring.

A plurality of balancing bores 66 extending longitudinally through the plug 60. Each balancing bore 66 opens into the interior of the cage 50. The balancing bores 66 are features of the fluid balancing system in the valve assembly.

The plug 60 is shown in the fully closed position in FIGS. 1 and 5, that is the plug 60 extends within the cage 50 and covers or obscures the inner ends of all the apertures 52 in the cage 50. It will be noted that the lower or free end of the plug 60 extends within the boss 56, that is a significant distance past the lowest apertures 52 in the cage 50.

The plug 60 depends at its upper end from the lower end of a generally cylindrical piston 68. The piston 68 extends upwards from the top of the cage 50, through the first chamber 24 in the upper housing 6 and into the second chamber 26, as shown in FIG. 1. The non-rotatable piston 68 engages with grooves in the wall of the first chamber 24 and is moveable longitudinally within the upper housing 6, that is vertically as shown in FIG. 1, in association with the plug 60. Seals 70 are disposed in the inner wall of the upper housing 6 at the junction between the first chamber 24 and the second chamber 26. The seals 70, of conventional or known configuration, allow the longitudinal movement of the piston 68 within the first and second chambers, but prevent fluid from passing between the first and second chambers 24, 26. The piston 68 has a central longitudinal bore 72, communicating with the bore 62 in the plug 60 at its lower end and opening into the second chamber 26 at its upper end, to receive the shaft 38. A plurality of fluid balancing bores 74 extend longitudinally within the piston 68, the lower end of each balancing bore 74 communicating with a corresponding balancing bore 66 in the plug 60, and the upper end of each fluid balancing bore 74 opening into the second chamber 26 within the upper housing 6.

The closure assembly 36 further comprises a sleeve assembly 80. The sleeve assembly 80 is generally cylindrical and extends from the lower end of the piston 68 around and along the outer surface of the cage 50 such that the sleeve assembly 80 can obscure and cover the outer ends of the apertures 52 in the cage. The sleeve assembly 80 is formed to be a close fit around the exterior surface of the cage 50, while still allowing the sleeve assembly 80 to move longitudinally with respect to the cage 50. The sleeve assembly 80 comprises an inner sleeve 82 and an outer sleeve 84, both generally cylindrical in form. The outer sleeve 84 is unitary with the piston 68. The inner sleeve 82 extends within the outer sleeve and is retained by a threaded connection 86 at their respective lower ends. This arrangement allows the inner sleeve 82 to be formed from tungsten and the outer sleeve 84 to be formed from stainless steel.

By being attached to the piston 68, the sleeve assembly is moveable both with the piston 68 and the plug 60. In particular, the sleeve assembly 80 moves together with the plug 60 under the action of the actuator assembly 30. The control of the flow of fluid through the apertures 52 of the cage 50 is determined by the positions of the plug 60 and sleeve assembly 80 with respect to the cage. As shown in the figures, the plug 60 extends a greater distance from the end of the piston 68 than the sleeve assembly 80. This arrangement in turn provides the plug 60 and the sleeve assembly 80 with different functions. In particular, in the arrangement shown, the sleeve assembly 80 primarily acts as a flow shut-off member, that is to ensure that the flow of fluid is prevented, when the assembly is in the fully closed position, as shown in FIG. 5, for example. When the assembly has been moved from the fully closed position shown, the control of the flow of fluid through the cage 50, and hence through the entire assembly, is primarily controlled by the plug 60.

In order to perform the function of a flow shut-off member, that is prevent the flow of fluid through the assembly, the sleeve assembly 80 is provided with a sealing arrangement at its lower end, that is the end distal of the piston 68. Referring to FIG. 6, there is shown an enlarged view of a portion of the flow control assembly 34 of FIG. 1, in particular showing the lower or distal end of the sleeve assembly 80. A seating ring 90 is mounted in the boss 56 by a threaded connection 92 and extends around the cage 50. The seating ring 90 is formed from a seating material to allow a ridge on the closure member to bed in. A seating surface 94 is formed by the surfaces of the boss 56 and the seating ring 90 exposed within the flow chamber 12. As can be seen in FIG. 6, the seating surface 94 extends at an angle to the radial direction, such that it slopes away from the free end of the sleeve assembly 80. The action of the angled seating surface is twofold. First, by being angled, debris is prevented from collecting on the seating surface and stopped from preventing a fluid-tight seal being formed between the sleeve assembly 80 and the seating surface. Rather, solid particles and debris are collected in the lower region of the flow chamber 12, as viewed in FIG. 6, around the base of the cage. Second, the angle of the seating surface 94 cooperates with the surfaces on the end of the sleeve assembly 80 to be self-sharpening, as is described herein below.

The seating surface 94 cooperates with the end portion of the sleeve assembly 80. As shown in FIG. 6, the free or distal end of the outer sleeve 84 is finished perpendicular to the longitudinal axis of the sleeve assembly, plug and cage. The distal end of the inner sleeve 82 is formed with a compound surface comprising a first surface portion 96 radially outwards of a second surface portion 98. The first surface portion 96 extends at an angle to the radial direction that is more acute than the angle of the seating surface 94. The second surface portion 98 extends at an angle to the radial direction that is more obtuse than the angle of the seating surface 94. The first and second surface portions 96, 98 meet at a ridge 100. The details of the seating surface 94 and its cooperation with the surfaces at the distal end of the sleeve assembly 80 are shown in FIG. 7.

In operation, the ridge 100 is forced by the actuator assembly 30 into contact with the seating surface 94 of the seating ring 90, as the flow control assembly is moved into the fully closed position, shown in FIGS. 6 and 7. Contact between the ridge 100 and the seating surface 94 forms a fluid-tight seal. Depending upon the force exerted by the actuator assembly 30, the ridge 100 is caused to slide along the seating surface 94, due to the angle of the seating surface 94. This sliding action causes the ridge 100 and seating surface 94 to bed in, in particular to wear and removes pits, marks and blemishes in the surfaces, which may prevent a proper fluid seal from being formed. In addition, the action of the actuator assembly 30 moving the sleeve assembly 80 in the longitudinally downwards direction, as viewed in FIGS. 6 and 7, results in a force being exerted on the ridge 100 and the distal end of the sleeve assembly 80 by the seating surface 94, as indicated by arrow P in FIG. 7. This force, normal to the seating surface 94, has a radially outwards component, which induces a hoop stress in the distal end portion of the sleeve assembly 80. The action of the hoop stress is to force the ridge 100 radially outwards, against the seating surface 94, as indicated by arrows P in FIG. 7. This in turn increases the effectiveness of the seal formed between the ridge 100 and the seating surface 94. In particular, high hoop stresses can be generated, in turn causing the ridge 100 to bed into the seating surface 94.

As noted above, the plug 60 and sleeve assembly 80 extend different longitudinal distances from the piston 68 and with respect to the cage 50. The closure assembly 36 is moveable between a fully closed position, as shown in FIG. 6, for example, to a fully open position. In the fully closed position, the sleeve assembly 80 is sealed against the seating surface 94, as described above and shown in detail in FIG. 7. The plug 60 extends longitudinally within the cage 50, with its free end extending beyond the seating surface 94, as shown in FIG. 6. In the fully closed position, the plug 60 and the sleeve assembly 80 cover and obscure the inner and outer ends of the apertures 52 in the cage 50, respectively, thus preventing fluid flow through the assembly 2. With the closure assembly in the fully open position, both the inner and outer ends of all the apertures 52 in the cage 50 are uncovered and open, allowing maximum fluid flow through the assembly. With the closure assembly 36 in an intermediate position, the flow of fluid is controlled between the maximum flow and zero.

Figure 8:
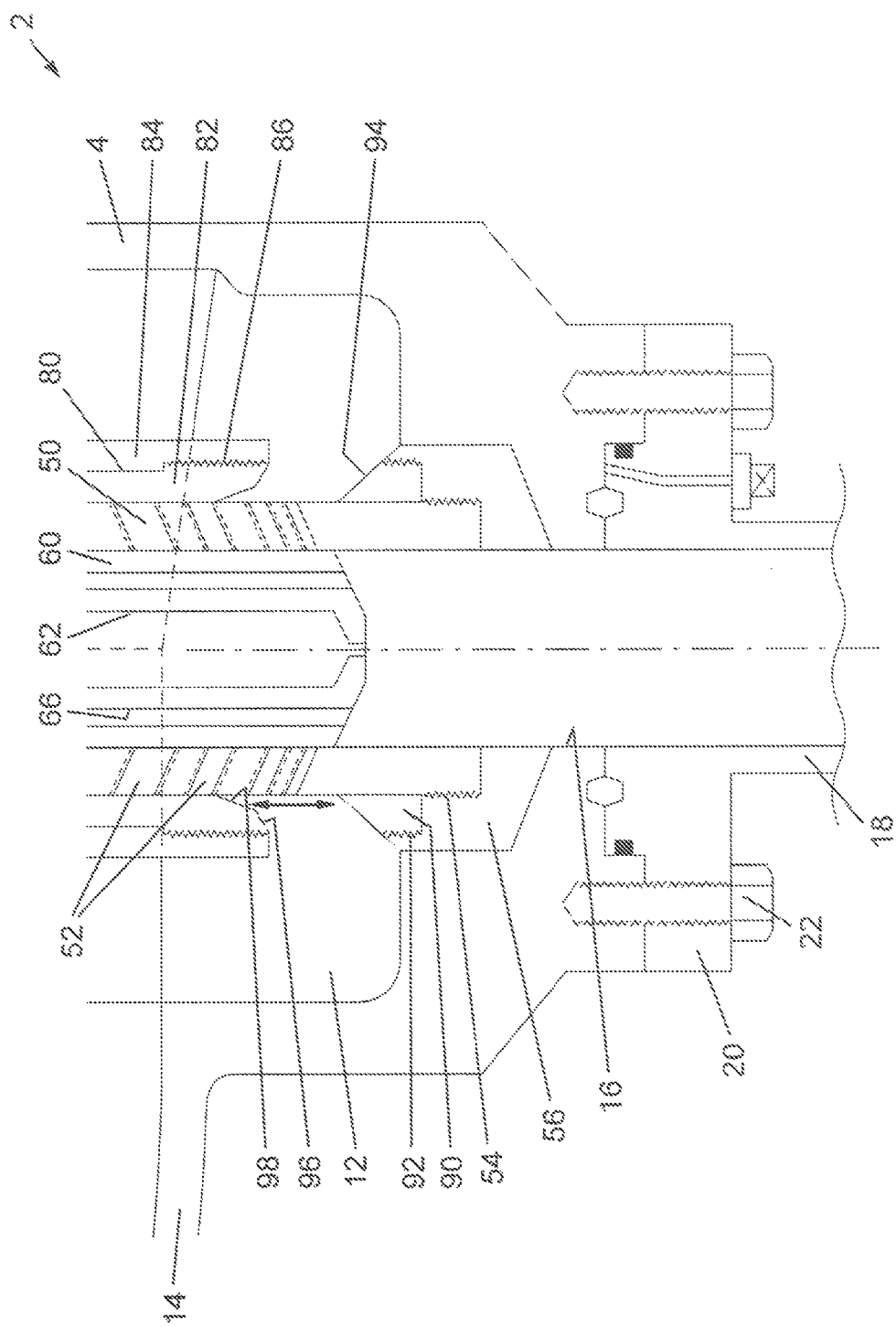
FIG. 8 is a cross-sectional view as in FIG. 6, but with the flow control assembly in a position intermediate between the fully closed position and the fully open position.

As noted, the sleeve assembly 80 has the primary function of shutting off fluid flow, by sealing against the seating surface 94, when in the fully closed position. As the actuator assembly 30 moves the closure assembly 36 longitudinally from the fully closed position, the sleeve assembly 80 is lifted from the seating surface 94, as shown in FIG. 8. The sleeve assembly 80 is moved to expose the outer ends of the apertures 52 closest to the seating surface 94. However, the plug 60, extending longitudinally further than the sleeve assembly 80, still covers the inner ends of all the apertures 52 in the cage 50. As a result, fluid does not flow. Rather, further movement of the closure assembly 36 beyond the position shown in FIG. 8 is required, such that the inner ends of apertures 52 are exposed and the respective apertures fully opened to allow fluid to flow therethrough. It will thus be appreciated that, once the closure assembly 36 is moved from the fully closed position of FIG. 6, the control of fluid flow is achieved by the position of the plug 60 with respect to the cage 50. This arrangement prevents the fluid flow causing erosion of the seat 94 and the ridge 100, regardless of the position of the sleeve assembly 80.

As noted above, the cage 50 is provided with a plurality of apertures 52 therethrough, to allow fluid to flow from the flow chamber 12 to the outlet 16. The apertures 52 may be of conventional design, form and arrangement. However, the apertures are preferably formed to lie in discrete rows, separated by lands and to extend at an angle to the radial direction and at an angle in the longitudinal direction to the perpendicular to the longitudinal axis.

Conventional designs employ circular apertures extending perpendicular to the outer surface of the cage in the radial direction, that is extend radially inwards. The apertures are nested to have the apertures in one row extend into the interstices between the apertures of each adjacent row. In this way, the sleeve or plug moving along the outer or inner surface of the cage is varying the area of exposed apertures throughout its entire movement. This has the advantage of allowing a compact cage to be formed and use a plug or sleeve having a short stroke. However, this has been found to cause a very rapid and deleterious erosion of the end surfaces and portions of the plug or sleeve.

The cage 50 comprises a plurality of apertures 52 extending through the wall of the cage, each aperture having an opening in both the inner and outer surface of the cage wall. Each aperture extends at both an angle to the radial direction and at an angle in the longitudinal direction to the normal or perpendicular, as noted above. In operation, the arrangement of the apertures causes fluid entering the cage 50 from the first port 14 to flow in a direction parallel to the inner wall and to flow in a circular pattern. This circular flow pattern prevents the incoming jets of fluid from opposing apertures from colliding within the cage. This in turn helps to maintain any separation of fluid phases that may be occurred or been induced upstream of the valve assembly and reduces the burden on fluid separation apparatus downstream of the assembly.

Further, considering the angle of the apertures in the longitudinal direction, each aperture extends at an angle to the perpendicular or radial direction longitudinally in the direction of flow. The apertures may extend at any suitable angle to the perpendicular or horizontal plane and the angle will depend upon such factors as the dimensions of the cage and valve assembly, and the nature and composition of the fluid being processed. In the arrangement shown in the figures, the apertures extend at an angle of 25° to the perpendicular or horizontal. The angle of the apertures may range from 5° to 50°, more preferably from 10° to 40°. It is preferred that the apertures are angled in the longitudinal direction sufficient to ensure that the jet of fluid entering the cage through one aperture and flowing in a circular pattern adjacent the inner wall of the cage avoids contacting the jet of fluid entering the cage through the adjacent aperture in the direction of travel of the fluid.

In operation, the arrangement of the apertures 52 induces the fluid to flow in a helical pattern within the cage in the general direction of flow within the cage 50, with the fluid being subjected to minimal shear.

The apertures 52 are arranged in discrete rows extending circumferentially around the cage, each row containing one or more apertures, more preferably at least two apertures. The rows are separated by portions of the cage wall having no apertures, or 'lands' 150. This allows the plug 60 to be positioned such that its end surface does not extend across the inner opening of one or more apertures 52. In this way, fluid entering the cage 50 through the open apertures 52 adjacent the end of the plug 60 is not caused to flow or cut across the end surface of the plug 60, in turn reducing the erosion of the plug 60 by the fluid stream. The endmost portion of the plug 60 may be provided with a taper, as shown in FIGS. 6 and 7, for example, in order to improve the flow pattern of the fluid in the region adjacent the end of the plug 60.

Figure 9:
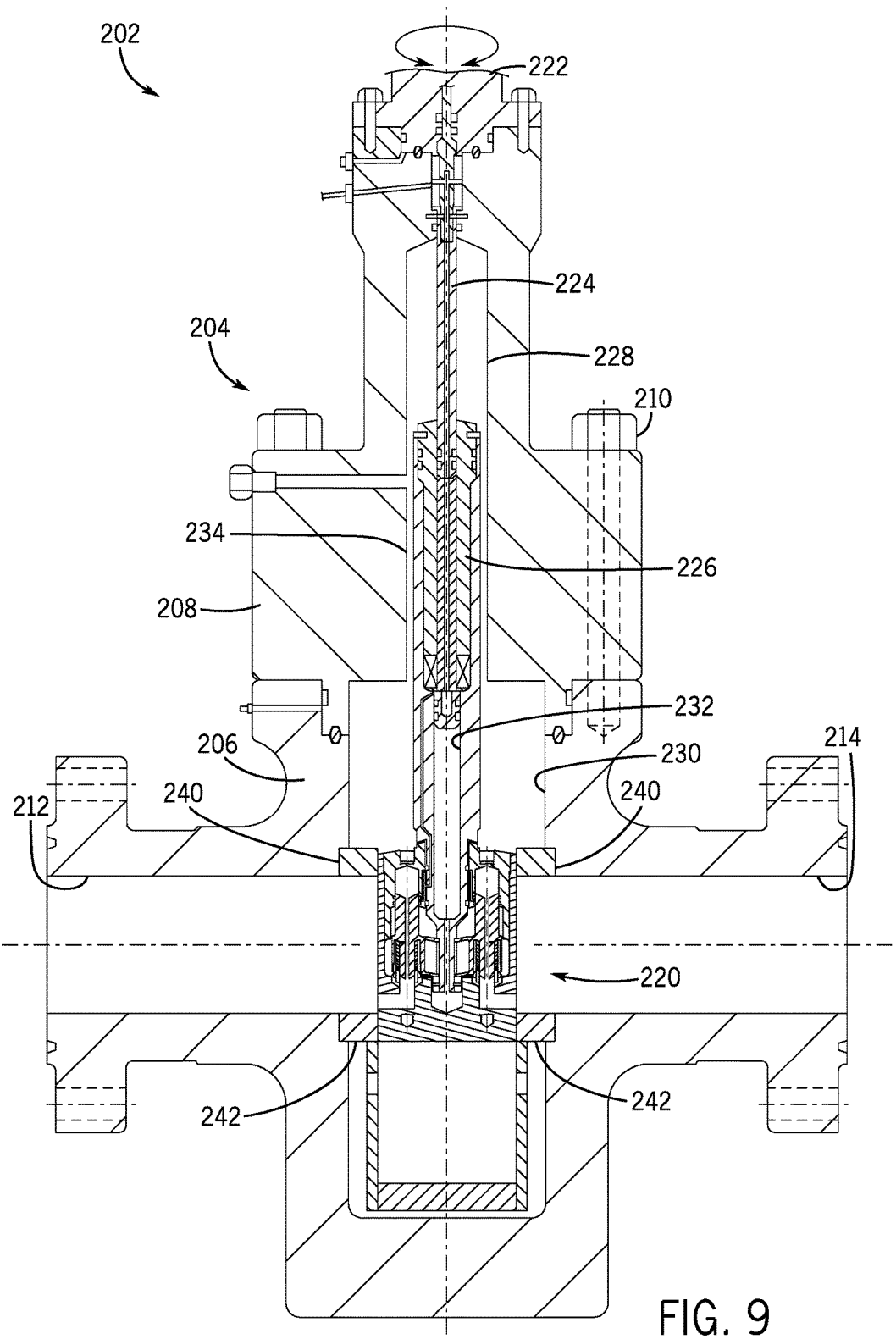
FIG. 9 is a cross-sectional view of a valve assembly according to one embodiment of the present invention and comprising two pressure equalizing valve assemblies of the general configuration of FIGS. 1 to 8 in the gate assembly thereof.

Turning now to FIG. 9, there is shown a valve assembly according to one embodiment of the present invention. The valve assembly, generally indicated as 202, comprises a gate valve 204. The gate valve 204 comprises a lower valve body 206 with an upper valve body 208 mounted thereto by bolts 210. The lower valve body 206 has an upstream port 212 and a downstream port 214. As represented in FIG. 9, fluid being processed enters the valve body through the upstream port 212 and leaves through the downstream port 214, the flow of fluid through the valve being indicated by arrows F.

The valve assembly 202 comprises a gate assembly 220 disposed within the valve bodies 206, 208 between the upstream port 212 and the downstream port 214. The gate assembly 220 is moveable within the valve bodies 206, 208 under the action of a rotary actuator 222. The actuator 222 is connected to the gate assembly 220 by a rotatable stem 224 extending within a shaft 226 of the gate assembly 220. In operation, rotation of the stem 224 by the actuator 222 causes the gate assembly 220 to move between a closed position, as shown in FIG. 9, and an open position. In the open position, the valve assembly 220 is accommodated within a chamber 228 formed within the lower valve body 206, while the shaft 226 is accommodated within a chamber 230 formed in the upper valve body 208. Similarly, a chamber 232 is formed in the shaft 226, for accommodating the lower end portion of the stem 224, as viewed in the figure.

A fluid bypass groove 234 is provided in the inner surface of the upper valve body 206 connecting the chamber 228 in the lower valve body 206 with the chamber 230 in the upper valve body 208, allowing fluid being processed to enter the chamber 230. In this way, the pressure of fluid being processed within the gate valve acts to balance the action of the gate assembly.

The gate valve 204 further comprises upper and lower seats 240, 242 located on either side of the gate assembly 220, as shown in FIG. 9. In operation, the gate assembly 220 seals against the seats 240, 242.

Figure 10:
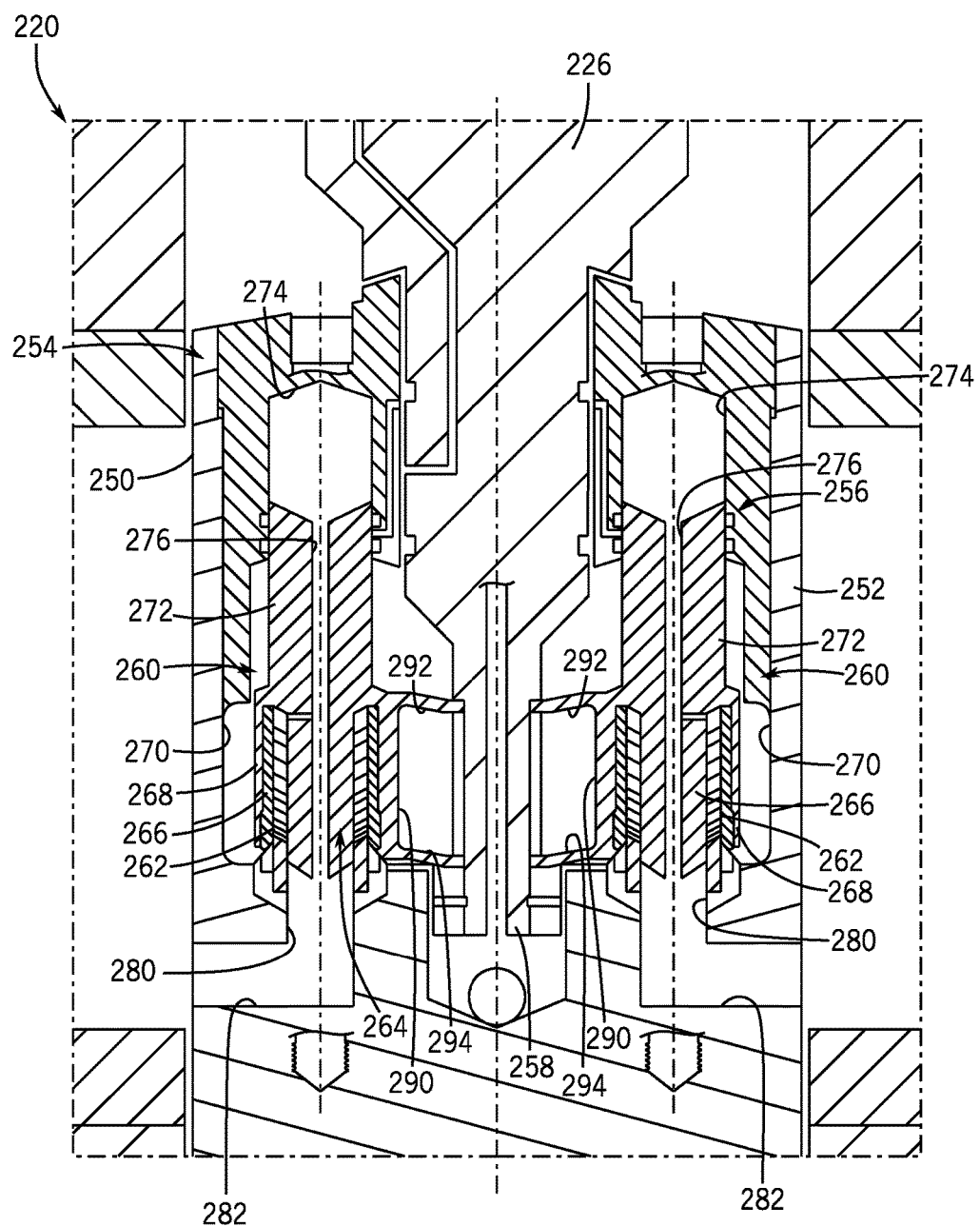
FIG. 10 is a cross-sectional view of the gate assembly of the valve assembly of FIG. 9.

Details of the gate assembly 220 are shown in FIG. 10, to which reference is now made. The gate assembly 220 comprises a first floating gate 250 on the upstream side of the gate assembly and a second floating gate 252 on the downstream side of the gate assembly. In operation, the floating gates 250, 252 seal against the seats 240, 242.

The gate assembly further comprises a first pressure equalizing valve assembly 254 adjacent the first floating gate 252 and a second pressure equalizing valve assembly 256 adjacent the second floating gate, the first and second pressure equalizing valve assemblies 254, 256 being disposed either side of a central gate actuating member 258 extending downwards from the lower end of the shaft 226, as viewed in FIG. 10.

Each of the first and second pressure equalizing valve assemblies 254, 256 is of the general configuration shown in FIGS. 1 to 8 and comprises a flow control assembly 260 having a generally cylindrical cage 262 having apertures therethrough, a closure assembly 264 having a plug 266 moveable within the cage 262 and a sleeve 268 moveable outside the cage. The plug 266 and its respective sleeve 268 are interconnected, as described hereinbefore, so as to move together with respect to the cage 262. The flow control assembly 260 of each pressure equalizing valve assembly 254, 256 is disposed within a chamber 270 formed within the gate assembly 220.

As noted, the plug 266 and sleeve 268 of each pressure equalizing valve assembly are interconnected. This interconnection is by means of a piston 272, from which both the plug 266 and the sleeve 268 depend. As described above with reference to the pressure equalizing valve assembly of FIG. 1, the assembly further comprises a second chamber 274, arranged to accommodate the piston 272 as it ascends (as viewed in FIG. 10). A bore 276 extends longitudinally through the piston 272 and the plug 266, connecting the second chamber 274 with the interior of the cage 262.

Each pressure equalizing valve assembly 254, 256 has a second port 280 in fluid connection with the interior of the cage 262. The second ports 280 extend via a conduit 282 to respective sides of the gate assembly 220. In particular, the second port 280 of the first pressure equalizing valve assembly 254 extends to the upstream side of the gate valve, while the second port 280 of the second pressure equalizing valve assembly 256 extends to the downstream side of the gate valve.

Each pressure equalizing valve assembly 254, 256 has a respective first port 290 in fluid connection with the chamber 270 of the pressure equalizing valve assembly. The two first ports are connected, so as to allow fluid to flow from one of the first ports directly to the other of the first ports. In particular, as shown in FIG. 10, the first ports are interconnected by a generally rectangular conduit 292 extending across the central portion of the gate assembly 220. The conduit 292 is formed by a flexible connection 294 extending between the closure assembly 260 of each pressure equalizing valve assembly 254, 256 and the central gate actuating member 258. In this way, movement of the gate actuating member 258 (vertically as viewed in FIG. 10) is transmitted to the closure assembly 260 of both the first and second pressure equalizing valve assemblies 254, 256 together, thereby moving both the plug 266 and the sleeve 268 of each pressure equalizing valve assembly together. By having the interconnection between the gate actuating member 258 and each closure assembly 260 flexible, it is ensured that equal force is applied to both closure assemblies by the gate actuating member 258, in particular in the closed position shown in FIG. 10.

In operation, with the gate valve in the closed position shown in FIG. 10, the shaft 226 is raised (as viewed in FIG. 10) by operation of the actuator 222. The initial action of raising the shaft 226 is to raise the gate actuating member 258, in turn raising the closure assembly 260 of both the pressure equalizing valve assemblies 254, 256 together. This raises the plug 266 and sleeve 268 of both pressure equalizing valve assemblies, opening the apertures in the wall of the cage 262 and allowing fluid to flow through both pressure equalizing valve assemblies.

Once both pressure equalizing valve assemblies begin to open, fluid at high pressure on the upstream side of the gate valve (that is the left hand side as viewed in FIG. 10) flows through the respective conduit 282 through the second port 280 and enters the interior of the cage 262 of the first pressure equalizing valve assembly 254. The fluid leaves the interior of the cage 262 through the apertures, enters the chamber 270 and leaves the first pressure equalizing valve assembly 254 through the first port 290. The fluid passes through the conduit 292 and enters the second pressure equalizing valve assembly 256 through its first port. From here, the fluid flows into the chamber 270 of the second pressure equalizing valve assembly 256, passes through the apertures in the wall of the cage 262 and into the cage interior. The fluid leaves the second pressure equalizing valve assembly 256 through the second port 280 and flows to the downstream side of the gate valve via the conduit 282.

The flow of fluid through the gate assembly is controlled by the position of the closure assembly 264 of each of the pressure equalizing valve assemblies. In particular, in the arrangement shown in FIG. 10, the fluid flow is controlled by the second pressure equalizing valve assembly 256, that is the pressure equalizing valve assembly having the fluid entering through its first port and leaving through its second port. In cases in which the general flow of fluid through the valve assembly is reversed, such that the upstream and downstream sides of the gate valve are reversed, it would be the first pressure equalizing valve assembly that is providing the major control over the flow of fluid through the gate assembly.

The position of the shaft 226 and the gate actuating member 258 is used to control the flow of fluid through the gate assembly from the upstream side to the downstream side, so as to equalize the fluid pressure on each side of the valve. Once the fluid pressure on each side of the gate assembly is equalized, the shaft 226 is raised further. As the shaft 226 is raised, the gate actuating member 258 is thereby raised, in turn raising the closure assembly 264 of each pressure equalizing valve assembly 254, 256. As the closure assembly 264 is raised, each piston 272 is raised into the respective chamber 274. Once the upper end of the piston 272 reaches the upper end of the chamber 274, continued upwards movement of the shaft 226 and the gate actuating member 258 causes the entire gate assembly to rise, including the two floating gates 250, 252. Thereafter, the general, bulk flow of fluid through the gate valve is controlled by the position of the shaft and the gate assembly.

Closure of the valve assembly is achieved by lowering the shaft 226, in turn lowering the entire gate assembly and finally lowering the closure assembly 264 of both the first pressure equalizing valve assembly 254 and the second pressure equalizing valve assembly 256, preventing the flow of fluid through the valve.

A described above, the embodiment shown in FIGS. 9 and 10 comprises both first and second pressure equalizing valve assemblies in the gate assembly. The first and second pressure equalizing valve assemblies are in reverse orientation, that is with one pressure equalizing valve assembly receiving fluid through its second port and the other pressure equalizing valve assembly discharging fluid through its second port. As noted above, this arrangement allows for accurate control of the fluid flowing through the gate assembly and, hence, efficient pressure equalization across the gate assembly, regardless of which side of the valve is upstream and which side is downstream. Similar control over the flow of fluid through the gate assembly and equalization of pressure across the gate assembly may be obtained with a single pressure equalizing valve assembly in the gate assembly. In this embodiment, the pressure equalizing valve assembly is arranged to have its first port exposed to fluid at the upstream or high pressure side of the valve and to discharge fluid through its second port to the downstream or low pressure side of the valve. However, such an arrangement is less efficient in controlling fluid flow and pressure equalization in cases where the general direction of fluid flowing through the gate valve is reversed and the upstream and downstream sides of the valve are exchanged.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A gate valve assembly, comprising:
   a gate assembly configured to move between an open position and a closed position to open and close a passage in a gate valve body, the gate assembly comprising:
      a first gate;
      a second gate; and
   a first pressure equalizing assembly between the first gate and the second gate, wherein the first pressure equalizing assembly is configured to equalize a fluid pressure in the gate valve body between upstream and downstream sides of the gate assembly, the first pressure equalizing assembly comprises:
      a housing, wherein the housing defines a first port configured to intake or discharge a fluid relative to the housing and a second port configured to intake or discharge the fluid relative to the housing;
      a flow control assembly disposed within the housing between the first and second ports, wherein the housing is configured to route the fluid entering the housing through the flow control assembly, the flow control assembly comprises:
         a cage that defines a plurality of apertures, wherein the cage is configured to route the fluid through one or more of the plurality of apertures between the first port and the second port; and
         a closure assembly, wherein the closure assembly comprises a closure member configured to open and close the plurality of apertures in the cage, wherein the closure member is configured to move a first distance independently of the first gate and the second gate to equalize the fluid pressure in the gate valve body between the upstream and downstream sides of the gate assembly.

2. The gate valve assembly according to claim 1, wherein the first gate is a first floating gate and the second gate is a second floating gate.

3. The gate valve assembly according to claim 1, wherein the first pressure equalizing assembly is configured to direct all the fluid entering the housing through the first or second ports to flow through the flow control assembly.

4. The gate valve assembly according to claim 1, wherein the first port is in fluid flow connection with the outside of the cage.

5. The gate valve assembly according to claim 4, wherein the second port is in fluid flow connection with an interior of the cage.

6. The gate valve assembly according to claim 1, wherein the housing comprises a cavity therein connected to the first port, the flow control assembly being disposed within the cavity.

7. The gate valve assembly according to claim 6, wherein the flow control assembly is arranged centrally within the cavity, such that the cavity extends around the flow control assembly.

8. The gate valve assembly according to claim 6, wherein the first port is arranged in the housing to extend tangentially to a wall of the cavity.

9. The gate valve assembly according to claim 1, wherein the cage is a generally cylindrical tube, with the plurality of apertures extending through a wall of the generally cylindrical tube.

10. The gate valve assembly according to claim 1, wherein the apertures are arranged in the cage in a plurality of rows, each row containing one or more apertures, with adjacent rows being separated by a land or region having no apertures therethrough.

11. The gate valve assembly according to claim 10, wherein a center of each of the plurality of the apertures in adjacent rows of the cage are offset from each other circumferentially around an exterior surface of the cage.

12. The gate valve assembly according to claim 11, wherein the apertures are arranged such that adjacent apertures in adjacent rows extend in a helical pattern along and around the cage.

13. The gate valve assembly according to claim 1, wherein the apertures extend inwards, in a plane perpendicular to a longitudinal axis of the cage at an angle to a radial direction.

14. The gate valve assembly according to claim 13, wherein the apertures extend through a wall of the cage and open tangentially to an inner surface of the wall of the cage.

15. The gate valve assembly according to claim 1, wherein the apertures extend through a wall of the cage at an angle to a plane perpendicular to a longitudinal axis of the cage and at an angle to a radial direction.

16. The gate valve assembly according to claim 15, wherein the apertures extend at an angle to the plane perpendicular to the longitudinal axis in either an upstream direction or downstream direction of fluid within the cage.

17. The gate valve assembly according to claim 16, wherein the apertures are angled to avoid a fluid stream from one aperture contacting the fluid stream from an adjacent aperture.

18. The gate valve assembly according to claim 1, wherein the closure member is disposed within the cage or outside of the cage, and the closure member is moveable with respect to the cage and the apertures extending through a wall of the cage.

19. The gate valve assembly according to claim 1, wherein the first pressure equalizing assembly comprises a first closure member disposed within the cage and a second closure member disposed outside the cage.

20. The gate valve assembly according to claim 19, wherein the first and second closure members are moveable together.

21. The gate valve assembly according to claim 20, wherein the first and second closure members are sized and arranged differently with respect to one another and the cage, such that in a given position of the closure assembly, the first and second closure members are obscuring and closing a different number of apertures.

22. The gate valve assembly according to claim 1, wherein the closure assembly of the first pressure equalizing assembly is arranged so as to be balanced with respect to the fluid pressure within the first pressure equalizing assembly.

23. The gate valve assembly according to claim 22, wherein the closure assembly is balanced with respect to both fluid pressure at the first port and fluid pressure at the second port.

24. The gate valve assembly according to claim 1, comprising a second pressure equalizing assembly, wherein the first and second pressure equalizing assemblies are actuated by a single actuator.

25. A gate valve assembly, comprising:
a gate assembly configured to move between an open position and a closed position to open and close a passage in a gate valve body, the gate assembly comprising:
a first gate;
a second gate; and
a pressure equalizing assembly between the first gate and the second gate, wherein the first pressure equalizing assembly is configured to equalize a fluid pressure in the gate valve body between upstream and downstream sides of the gate assembly.

* * * * *